Jan. 7, 1969     H. H. OSTROFF ET AL     3,420,060
PRESSURE INDUCED JET VECTORING AUGMENTATION APPARATUS
Filed April 22, 1966

INVENTORS
HAROLD H. OSTROFF
ERNEST W. TONEY
BY Gravely, Lieder & Woodruff
ATTORNEYS Jan. 7, 1969  H. H. OSTROFF ET AL  3,420,060
PRESSURE INDUCED JET VECTORING AUGMENTATION APPARATUS
Filed April 22, 1966

INVENTORS
HAROLD H. OSTROFF
ERNEST W. TONEY
BY Gravely, Lieder & Woodruff
ATTORNEYS

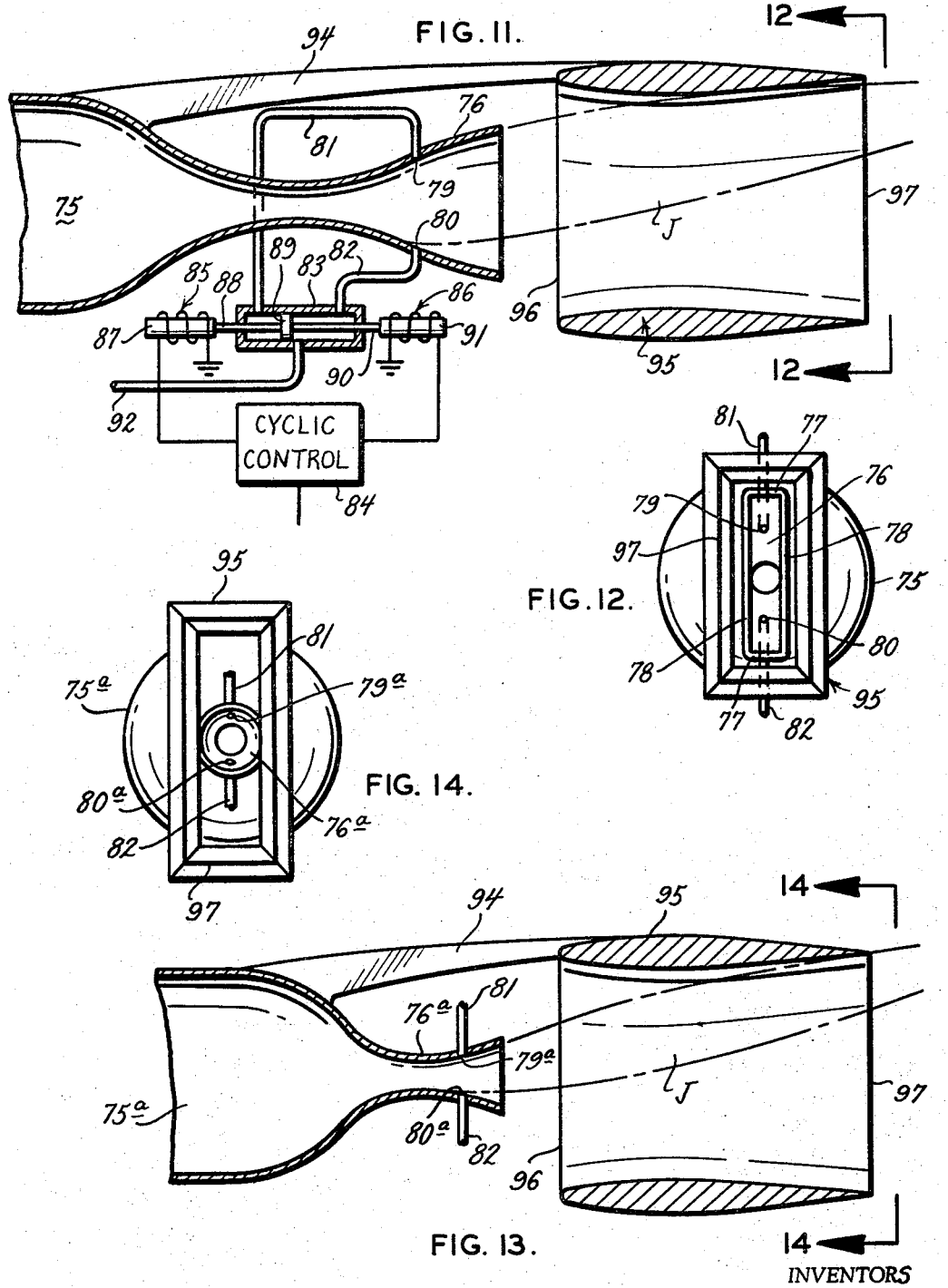

United States Patent Office 3,420,060
Patented Jan. 7, 1969

3,420,060
PRESSURE INDUCED JET VECTORING AUGMENTATION APPARATUS
Harold H. Ostroff and Ernest W. Toney, Normandy, Mo., assignors, by mesne assignments, to McDonnell Douglas Corporation, St. Louis County, Mo., a corporation of Maryland
Filed Apr. 22, 1966, Ser. No. 544,492
U.S. Cl. 60—264
Int. Cl. F02k *3/04;* B63h *25/46;* B64c *15/10*
10 Claims

ABSTRACT OF THE DISCLOSURE

Vectoring and jet augmentation apparatus utilizing control means for delivering around the inner periphery of a jet nozzle a flow of fluid that will cause the main jet axis to sweep around the inner surface of the nozzle, such apparatus including augmentation means in the form of a shroud spaced downstream from the main jet nozzle.

---

This invention relates to pressure induced jet vectoring apparatus and to a method of generating jet vectoring, and it is particularly concerned with obtaining a rotating or sweeping discharge from a vehicle propelling jet or rocket engine for thrust augmentation.

The present invention is an improvement on the systems and apparatus for augmenting the thrust of exhaust jets such as are found in present vehicle propelling rocket and jet engines. It is also an improvement on rotating exhaust nozzle devices for augmenting the thrust. It is appreciated that the presently known means for rotating the discharge jets of such engines are unable to stand up under the intense heat developed by rocket and afterburning turbojet engines. Elimination of the mechanical rotating devices will extend the reliability, life, utility and range of applications and improve performance.

Flow induction tests have shown that substantially improved thrust augmentation can be realized when using rotatry primary jets instead of fixed jets exhausting into a circular shroud. This improvement can be expected to be even larger when comparing rotary to fixed pirmary jets if the primary gas is heated as in turbojet and rocket engines. In the apparatus described herein the rotary or sweeping motion of the primary jet is obtained by discharging the jet through a zone in which pressure induced effects on the jet flow cause circular or sweeping vectoring of the jet flow in a stationary nozzle. This method is ideally suited to high temperature nozzles from a structural standpoint and substantially reduces the weight of the apparatus when compared with a mechanical rotating primary jet nozzle.

It is therefore a main object of this invention to provide a simple method of applying pressure induced effects on high temperature jet flow to cause circular or sweeping vectoring of a jet and gain substantial augmentation of thrust reaction.

It is an object of this invention to provide simple apparatus for obtaining vectoring of a primary jet in a fixed nozzle.

It is another object of this invention to provide an overexpanded nozzle with an array of bleed ports in the nozzle and to control the bleed ports progressively for causing the jet to rotate as it flows through a fixed shroud thereby augmenting the resultant thrust.

It is another object of this invention to provide an overexpanded circular or rectangular nozzle with opposed bleed ports in the nozzle and to control the bleed ports alternately for causing the jet to sweep back and forth as it flows through a fixed rectangular shroud thereby augmenting the resultant thrust.

It is a further object of this invention to provide apparatus for causing circular jet vectoring by a flow of fluid injected progressively around the circumference of an overexpanded nozzle.

Other objects and advantages of the present invention will be set forth in the course of the following disclosure relating to certain preferred forms of the apparatus which includes an overexpanded nozzle for the primary jet flow, a shroud associated with the nozzle in such manner that secondary induced flow is created by the vectoring of the primary jet flow, and means associated with bleed ports in the nozzle for initiating and continuing the rotation or sweeping of the primary jet flow.

The apparatus herein preferred is illustrated in the accompanying drawings, wherein:

FIG. 11 is a longitudinal sectional elevational view of a modified assembly of nozzle and shroud with control means;

FIG. 12 is an end view taken at line 12—12 in FIG. 11;

FIG. 13 is a longitudinal sectional elevational view of a further modified assembly of nozzle and shroud with control means; and FIG. 14 is an end elevation taken at line 13—13 in FIG. 13.

Figure 1:
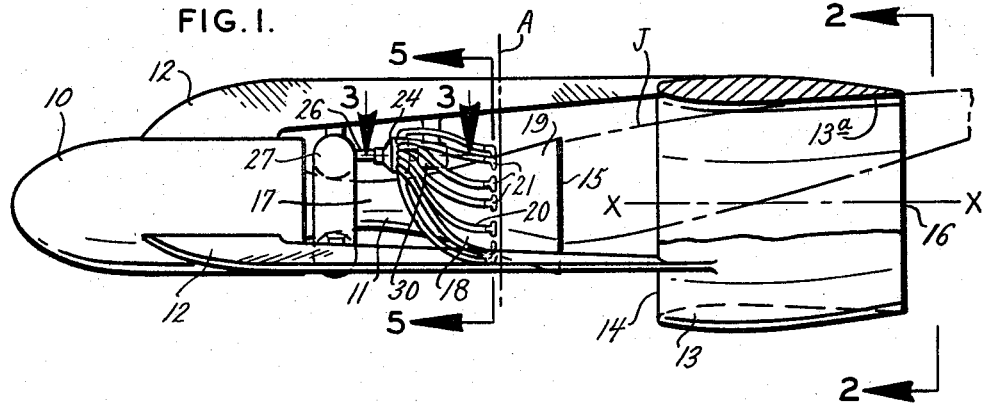
FIG. 1 is a longitudinal partly sectional view of a rocket asembly provided with the components that cause circular diversion of a jet stream for obtaining thrust augmentation.

In FIG. 1 the rocket engine 10 is shown as a body containing suitable fuel for producing a flow of primary hot gas which is expelled through the exhaust nozzle 11. The rocket engine 10 is provided with suitable struts 12 (three being indicated) which are aftwardly directed in spaced relation to the nozzle 11. The struts 12 support a shroud 13 having airfoil shaped walls, and the shroud inlet end 14 is larger in cross sectional area than and spaced from the trailing end 15 of the nozzle to provide an entrance for the flow of secondary ambient air which augments the mass flow of primary hot gas through the shroud 13 and out the exhaust end 16 thereof.

The exhaust nozzle 11 has a convergent-divergent section 17 which extends beyond a jet flow breakaway zone indicated by the station line A. The overexpanded nozzle 11 is a device in which the divergent portion 18 has its walls projected afterwardly to the exhaust end 15 beyond the zone or station A at which the exhaust jet breaks away from the wall. However, the excess wall length, illustrated at 19, beyond the breakaway station A is utilized to contain the jet flow and direct the flow in the desired manner during its rotary sweep about the axis X—X of the shroud 13.

Figure 2:
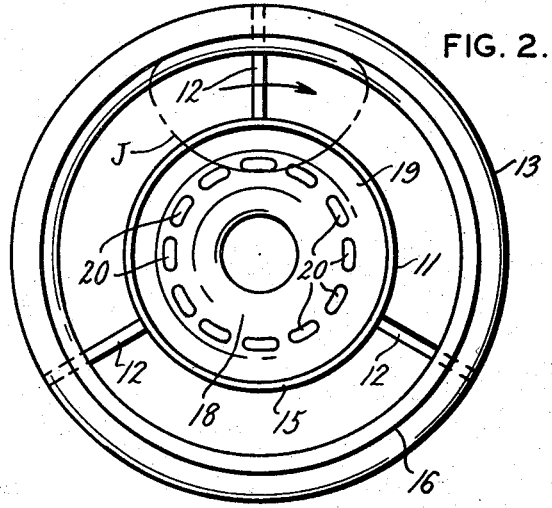
FIG. 2 is an end elevational view taken at line 2—2 in FIG. 1.
Figure 5:
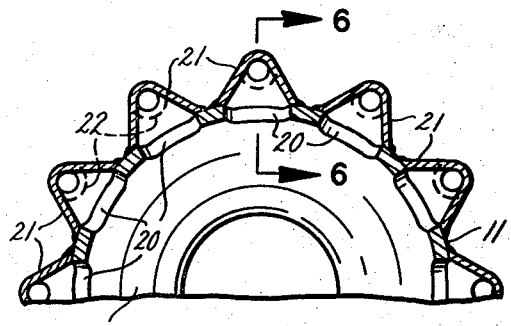
FIG. 5 is a fragmentary sectional view taken at line 5—5 in FIG. 1.
Figure 6:
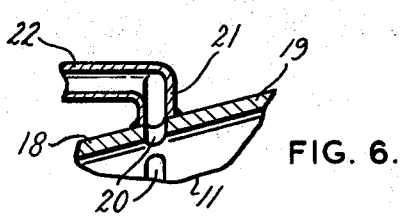
FIG. 6 is a fragmentary sectional view taken at line 6—6 in FIG. 5.

In FIGS. 1, 2 and 5 the nozzle 11 is shown formed with a circumferential array of ports 20 opening through the nozzle wall just forwardly of the jet breakaway station A. Each port 20 communicates with a suitable fitting 21 (FIG. 6) attached over the port 20. Each of a plurality of conduits 22 has one end connected to a fitting 21 and its opposite end is connected to a fitting 23 attached in the wall of a rotary valve housing 24. The housing 24 is suitably mounted on one of the struts 12 and is formed with an inlet end 25 that is connected by conduit 26 to the outlet of a container 27 of fluid under pressure. The cylinder 27 may be carried by the struts 12 that support the shroud 13. The opposite end of the housing (FIG. 3) is provided with a bearing extension 28 to receive the shaft 29 of a motor means 30 also mounted on the adjacent strut 12.

Figure 3:
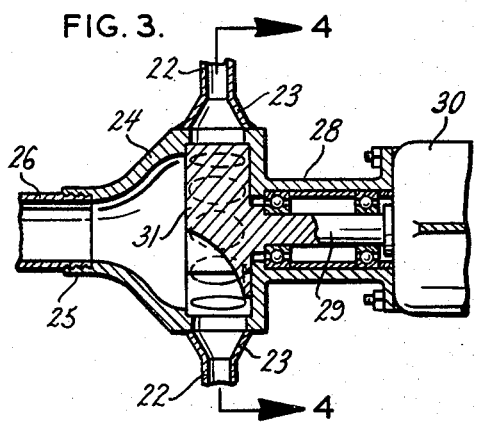
FIG. 3 is a fragmentary sectional view of the control means taken at line 3—3 in FIG. 1.
Figure 4:
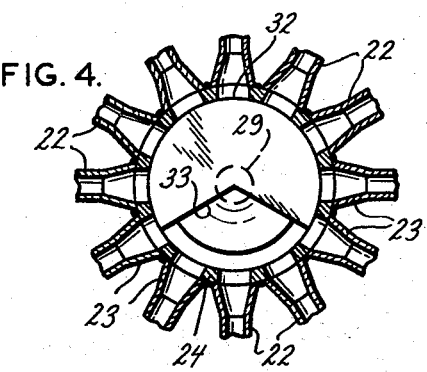
FIG. 4 is a fragmentary sectional view of the control means seen at line 4—4 in FIG. 3.

As shown in FIGS. 3 and 4 the shaft 29 extends into the housing 24 and drives a rotor 31 which controls the flow of the pressure fluid from container 27 to each of the outlet fittings 23 in the side wall of the housing. The rotor 31 is a cylindrical member having a circumferential surface 32 that progressively closes a plurality of the outlet fittings 23, but a portion of the circumferential surface is cut away at 33 to uncover a group of fittings 23 for the flow of the pressure fluid into conduits 22 and thence to the fittings 21 at the nozzle ports 20. In the apparatus shown there are twelve outlet fittings 23 at the housing 24 and a similar number of fittings 21 and ports 20 at the nozzle 11. The control rotor 31 has its cut away section 33 of a circumferential length to uncover a suitable number, as four outlets, and cover eight outlets. As the rotor 31 rotates it progressively covers and uncovers the array of outlets so that the pressure fluid from container 27 progressively flows to the nozzle ports 20.

The control effect of the rotor 31 is to create a circular sweep of the pressure fluid around the array of nozzle ports 20 so that a part only of the exhaust jet flow in the nozzle 11 is caused to break away from the nozzle wall downstream of station A. The jet exhaust flow is thereby directed at an angle to the axis X—X of the rocket engine shroud and the jet flow plume or envelope (FIGS. 1 and 2) is caused to sweep around within the shroud 13 at a vector angle relative to the longitudinal axis X—X such that the jet envelope J passes along the inner trailing surface 13A of the shroud 13 adjacent the exhaust end 16. As the jet envelope J rotates it sweeps in a circular manner about the shroud 13 and induces a flow of ambient air into the shroud inlet 14. The secondary air flow experiences an increase of velocity which increases the mass of fluid flowing in the shroud and the momentum of the total mass of primary and secondary streams produces an augmented thrust. While some mixing of the primary and secondary flows results, it is the action of the rotary primary envelope J exerted on the secondary flow that increases the secondary flow beyond that normally induced by a steady non-rotating jet envelope.

Figure 7:
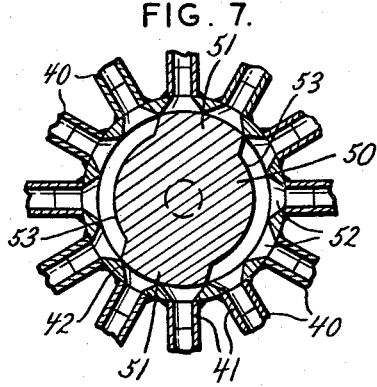
FIG. 7 is a fragmentary view of a modified control means for producing circular diversion of the jet flow in a pair of streams for thrust augmentation of a rocket assembly like that in FIG. 1, the view being taken at line 7—7 in FIG. 8.
Figure 9:
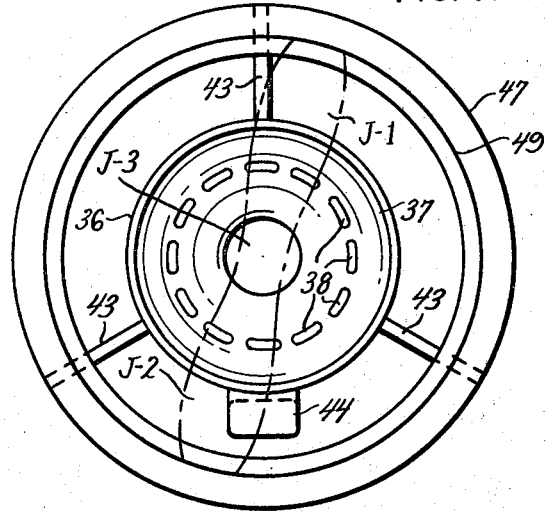
FIG. 9 is an end elevational view taken at line 9—9 in FIG. 8 showing the pair of jet streams produced by the control means of FIG. 7.
Figure 8:
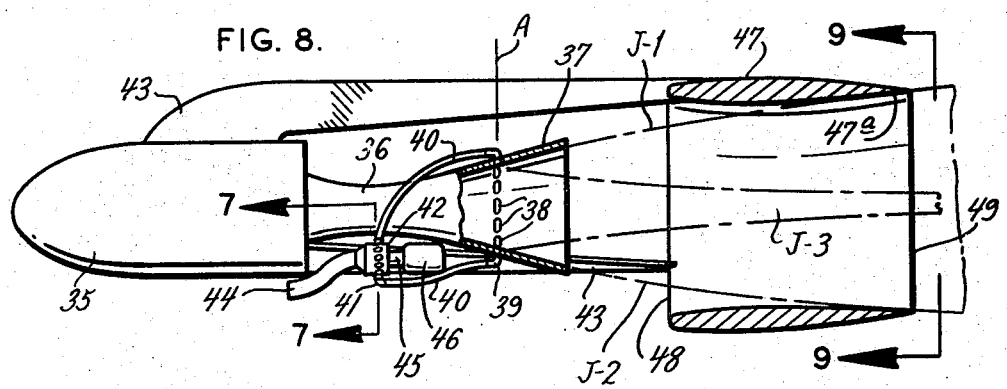
FIG. 8 is a longitudinal partly sectional view of a modified rocket assembly provided with the control means of FIG. 7 for producing the pair of jet streams.

Turning now to FIGS. 7, 8 and 9 the modified rocket assembly includes the fuel containing body 35 provided with a nozzle 36 of convergent-divergent form which extends beyond the station A in an overexpanded length at 37. Just upstream of station A the nozzle 36 is provided with a circular array of ports 38 (as shown in FIG. 9) each of which has a suitable fitting 39 thereover to connect with conduits 40 that extend to connections with fittings 41 at a rotary control housing 42 suitably mounted on one of the aftwardly directed struts 43 carried by the rocket body 35. The housing 42 has a ram or static pressure air inlet conduit 44 at one side (or it may be connected to a container 27 of fluid under pressure as in FIG. 1) and the opposite side has a bearing extension 45 for the shaft of a drive motor 46. The struts 43 support a shroud 47 that is similar to shroud 13 in FIG. 1 in that it has a circular wall of airfoil configuration which provides an inlet end 48 larger in cross sectional area than the exhaust end of the nozzle 37 for intake of secondary or ambient air and an exhaust end 49 for tht exhaust of the combined mass flow of primary rocket gas and secondary air.

In FIG. 7, the housing 42 encloses a rotary control member 50 having oppositely spaced segments 51 which progressively close the housing outlet ports 52. Between the segments 51 the rotor is cut away at 53 to open the associated outlet ports 52. (In the device shown 8 ports 52 in spaced groups of 4 are open and 4 ports 52 in spaced groups of 2 are closed.) Thus ram air (or pressurized fluid as indicated above) received into conduit 44 flows through the open ports 52 and passes to the associated ports 38 at the nozzle 36. This flow in two streams progressively flows through the two groups of ports 38 to cause the rocket jet exhaust gas to breakaway from the wall 37 of the overexpanded nozzle 36 downstream of station A and form two symmetrical and opposite jet plumes J–1 and J–2 joined at J–3. The resulting jet stream J–1, J–2 and J–3 forms a jet fan that rotates within the shroud 47 and sweeps along the trailing interior wall surface 47A of the shroud adjacent the exhaust end 49. The fan shaped envelope of the primary jet stream flow pumps the flow of secondary air into the shroud inlet 48 and increases the total air flow thereof over that normally caused by the ram effect due to the forward motion of the rocket body 35. As a consequence of the increased mass flow, thrust augmentation is achieved without mechanically inducing the same.

Figure 10:
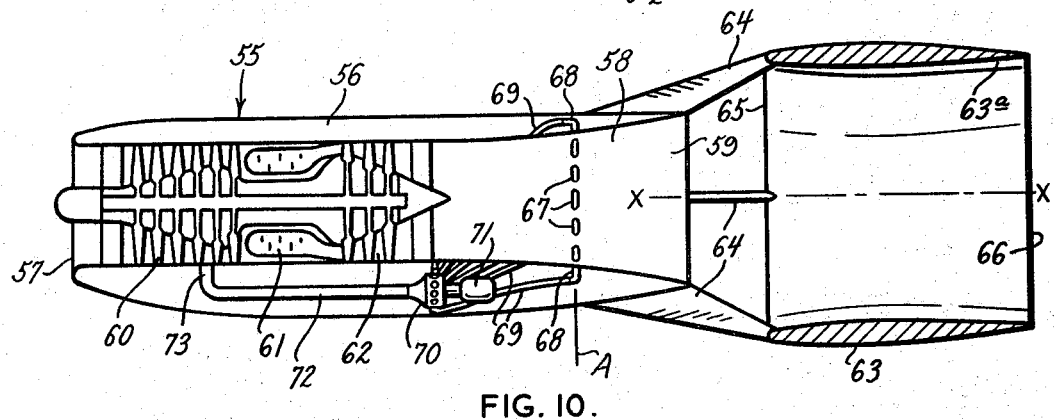
FIG. 10 is a longitudinal and partly sectional view of turbojet engine having control means for producing rotary jet vectoring to obtain thrust augmentation.

In FIG. 10 the present jet vectoring scheme is shown applied to a turbojet engine 55. The engine 55 has a housing 56 with an inlet end 57 and a jet exhaust nozzle 58 of overexpanded configuration in which the exhaust end 59 extends downstream from station A at which the exhaust jet breaks away from the nozzle wall. Air from the inlet end 57 of the engine casing 56 passes through the compressor section 60, the combustion section 61 and turbine section 62 to the nozzle 58. The exhaust jet stream passes into the shroud 63 spaced from the nozzle end 59 on a plurality of suitable struts 64 attached to the casing 56. The shroud 63 has an inlet end 65 larger in cross sectional area than nozzle 59 and an exhaust end 66 symmetrically related to the longitudinal axis X—X.

The means for vectoring the turbojet exhaust flow in a circular flow includes a circular array of ports 67 in the wall of the nozzle 58 just upstream from station A. Each port has a suitable fitting 68 and each fitting connects with a conduit 69 leading to the housing 70 of a vectoring control device in which a rotor (as in either of FIGS. 4 or 7) is driven by motor means 71 or by the turbojet through suitable gears and shafts as commonly employed to drive turbine engine accessories. The housing 70 has a conduit 72 connected to its inlet side, and the conduit 72 extends to a by-pass connection 73 in the compressor section of the engine 55 where a supply of air under pressure is obtained. In accordance with the teaching of either FIG. 1 or FIG. 8, the exhaust jet from nozzle 58 is formed into a rotating envelope of exhaust gas which flows into the shroud and sweeps aftwardly along the wall surface 63A adjacent the shroud exhaust end 66, thereby pumping secondary air into the inlet 65 and increasing mass flow thereof above that normally effected when stationary or by the ram action of the apparatus when in motion.

Turning now to FIGS. 11 and 12, the reaction type propulsion motor or engine 75 has a nozzle 76 of rectangular form in which the upper and lower walls 77 are short and the opposite side walls 78 are long. The nozzle has opposed orifices 79 and 80 located upstream of the station where the jet stream breaks away from the nozzle walls 77. The orifices 79 and 80 are connected to conduits 81 and 82 respectively which connect with the cylinder 83 of a control system. The system includes a cyclic controller 84 of any suitable character which alternately energizes grounded solenoids 85 and 86. The armature 87 of solenoid 85 is connected by rod 88 to one side of a piston 89 in the cylinder 83. The opposite side of piston 89 is connected by rod 90 to the armature 91 of solenoid 86. The cylinder is connected to a source of pressure fluid by conduit 92.

In operation, the controller 84, through the solenoids 85 and 86 causes the piston 89 in cylinder 83 to shuttle or oscillate to either side of the pressure fluid feed conduit 92. This alternately admits pressure fluid to orifices 79 and 80 for causing the jet stream J to break away from the normal axial direction. The jet stream J thus sweeps up and down in a shroud 95. The engine 75 has suitable struts 94 (one being shown) that support the shroud 95 of rectangular form in end view (FIG. 12). The shroud has an airfoil section and is located aftwardly of the nozzle 76 so that ambient air is freely induced to flow into the shroud inlet end 96 and be thrust rearwardly of the shroud outlet 97. As a consequence of the increase in mass flow through the shroud 95 (the mass of the jet stream J and the mass of ambient air induced to flow through the shroud) thrust augmentation is achieved quite simply without having direct mechanical means to do the work.

In FIGS. 13 and 14 there is a means shown which is a variation of the means in FIGS. 11 and 12. In this variation the vehicle propulsion engine 75a has a round nozzle 76a formed with opposed orifices 79a and 80a therein connected to the conduits 81 and 82 as before described. The shroud 95 has struts 94 (one being shown) which connects it to the engine 75a, as before described.

In the disclosure of FIGS. 11 and 13, the jet stream J is caused to sweep back and forth in the shroud which has a rectangular shape, thereby inducing ambient air to flow into the inlet end 96 to combine with the jet stream to produce thrust augmentation.

In any of the various preferred forms of this invention a substantial improvement in performance is obtained by the vectored primary jet flow as compared with a fixed jet. The heated primary gas flow induces by its rotating or sweeping envelope a much larger flow of secondary or ambient air which augments the thrust. Higher jet temperatures may be handled by the present method of jet vectoring. The apparatus for practicing the method is simple and lightweight, involving a simple rotary or cyclic control device, or a shuttle valve, for progressively or sequentially opening and closing the array of ports at the primary jet exhaust nozzle. In certain preferred forms of the invention a fluid under pressure is supplied through the control device, but as shown in FIG. 8, ram air or even air at ambient static pressure can be applied in view of the normal suction effect by the jet flow past the array of ports in the nozzle wall. It can be appreciated that the jet envelope will rotate or sweep in timed relation with the control device. While a single jet envelope will cause some unbalanced forces on the nozzle, the dual jet envelope will result in a balanced rotating fan-shaped jet. In each form of the invention the control device is located as close to the nozzle ports as possible to minimize the length of the conduits. In certain apparatus it is recognized that two or more synchronized control devices can be used to further shorten the conduits to the nozzle ports. For example, in FIG. 1 each strut 12 can be used to carry a housing 24 and its motor means 30. Each housing 24 would be connected to one third of the nozzle ports 20 and to the container 27. Synchronous motor or other drive means 20 would then control the action of the system to obtain smooth rotation of the exhaust jet envelope J as is understood from the disclosure herein given.

It is pointed out that in any of the forms of the present apparatus there is an optimum cone angle for each shroud size which is selected such that the jet stream envelope boundary passes close to the surface of the shroud near the trailing edge or outlet end thereof. This has been depicted in the drawings by having the jet stream J directed substantially tangentially of the shroud surface near the outlet end. As for the pressure fluid employed to cause jet stream vectoring, any inert gas which can be stored under pressure can be selected. Also a pressurized liquid which upon release flashes into a gas may be used. The gas or liquid used in the several control systems should be supplied to the ports in the overexpanded nozzles 19, 37, 59, 76 or 76a at a pressure which varies with the flow in the main jet. The relationship may be of the order of 7 to 11 percent by weight of the main jet flow.

There has been disclosed above apparatus for practicing the method of rotary or sweeping jet vectoring of the exhaust jet from a rocket or jet engine, and it is understood that changes may be made in the means for practicing the invention without departing from the spirit and scope of the appended claims.

What is claimed is:

1. In a jet vectoring system for thrust augmentation of a propulsion jet, the combination of a source of primary high velocity gas, nozzle means connected to said gas source to form a primary gas jet having a normally steady axial flow direction, an open ended shroud device adjacent said nozzle means in axial alignment therewith to direct said primary gas jet, said shroud having an inlet end to receive secondary fluid and an outlet end to exhaust said primary gas and secondary fluid, a series of fittings spaced about said nozzle means and opening to the interior, and vectoring control means connected to said fittings and including a source of fluid delivered through said fittings and into said nozzle means to move the axis of said jet of primary gas out of said normally steady axial flow such that the axis of the primary gas jet sweeps continually through said shroud device to pump said secondary fluid thereinto and increase the mass flow from said shroud outlet end.

2. The apparatus of claim 1 wherein said source of primary high velocity gas is a rocket motor.

3. The apparatus of claim 1 wherein said source of primary high velocity gas is a jet engine.

4. The apparatus of claim 1 wherein said shroud inlet end is larger in cross-sectional area than said nozzle means.

5. The apparatus of claim 1 wherein a fluid under pressure is supplied to said fittings of the vectoring control means for effecting the continuous sweeping movement of said primary gas jet.

6. In exhaust jet thrust reaction propulsion apparatus, in combination, a body to generate a high pressure stream of primary gas, nozzle means connected to said body to form said primary gas stream into a high velocity reaction jet, said nozzle means having an outlet end, and at least one pair of opposed ports in said nozzle means spaced upstream from said outlet end, a control device having outlets connected to said nozzle ports, said control device having an inlet to receive fluid under pressure, a rotor in said control device to connect said inlet successively with each of said outlets, drive means operably connected to said control means rotor to sequentially admit pressure fluid to said outlets for flow to said nozzle ports for continuously angularly diverting the reaction jet relative to the axis of said nozzle means in a sweeping motion, and shroud means connected to said body and extending downstream from said outlet end of said nozzle means, said shroud means defining a passage to receive and be continuously angularly swept by said reaction jet for inducing a flow of secondary ambient fluid, and said shroud means having an outlet end for said primary gas stream and secondary ambient fluid to provide a combined thrust reaction jet.

7. The propulsion apparatus of claim 6 wherein said nozzle means has an array of ports spaced about the axis of the primary gas stream and each port is connected to said control device, said drive means sequentially admitting pressure fluid to said array of ports for angularly diverting the reaction jet in a circular path.

8. The propulsion apparatus of claim 7 wherein said nozzle means is an overexpanded nozzle and said array of ports are located upstream of the jet flow breakaway station for said nozzle.

9. The propulsion apparatus of claim 7 wherein said control device includes a rotor having a circumferential surface interrupted by a cut-away portion to admit pressure fluid flow progressively to groups of said nozzle ports to divert the primary gas stream in a single angularly rotating jet envelope.

10. The propulsion apparatus of claim 7 wherein said control device includes a rotor having a pair of circumferential segmental surfaces in opposite spaced relation and intervening cut-away portions therebetween to admit pressure fluid flow progressively to groups of said nozzle ports to divert the primary gas stream in a double angularly rotating fan-shaped jet envelope.

References Cited

UNITED STATES PATENTS

| | | | |
|---|---|---|---|
| 1,375,601 | 4/1921 | Morize | 60—264 |
| 3,001,691 | 9/1961 | Salmon et al. | 60—264 X |
| 3,046,732 | 7/1962 | Foa | 60—264 X |
| 3,066,485 | 12/1962 | Bertin et al. | 60—231 |
| 3,128,602 | 4/1964 | Salemka | 60—231 X |

CARLTON R. CROYLE, *Primary Examiner.*